United States Patent
Sun et al.

(10) Patent No.: US 11,552,486 B2
(45) Date of Patent: Jan. 10, 2023

(54) PORTABLE VEHICLE CHARGING SYSTEM WITH LOCATION DETECTION

(71) Applicant: FORD GLOBAL TECHNOLOGIES, LLC, Dearborn, MI (US)

(72) Inventors: Baocheng Sun, Beverly Hills, MI (US); Madison Warsaw, Detroit, MI (US); Timothy Harris, Grosse Ile, MI (US); Mike Hamzeh, Flat Rock, MI (US); Kevin Schneier, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/939,810

(22) Filed: Jul. 27, 2020

(65) Prior Publication Data

US 2022/0029434 A1 Jan. 27, 2022

(51) Int. Cl.
*H02J 7/00* (2006.01)
*B60L 53/62* (2019.01)
*H01R 31/06* (2006.01)
*B60L 53/16* (2019.01)

(52) U.S. Cl.
CPC .......... *H02J 7/0042* (2013.01); *B60L 53/16* (2019.02); *B60L 53/62* (2019.02); *H01R 31/065* (2013.01)

(58) Field of Classification Search
CPC .............................. H02J 7/0042; B60L 53/62
USPC ......................................................... 320/104
See application file for complete search history.

(56) References Cited

U.S. PATENT DOCUMENTS

| | | | |
|---|---|---|---|
| 7,013,151 B2 | 3/2006 | Hirokawa | |
| 8,509,976 B2 | 8/2013 | Kempton | |
| 2003/0064731 A1 | 4/2003 | Angelo et al. | |
| 2011/0161143 A1* | 6/2011 | Tajima | G01R 22/10 705/14.1 |
| 2013/0110296 A1* | 5/2013 | Khoo | G06Q 20/102 700/286 |
| 2015/0380964 A1* | 12/2015 | Tischer | H02J 7/0044 320/114 |
| 2018/0198291 A1* | 7/2018 | Kuo | H02J 7/0014 |
| 2020/0317069 A1* | 10/2020 | Akai | B60L 53/18 |
| 2021/0155103 A1* | 5/2021 | Zhu | H02M 3/33507 |
| 2021/0206284 A1* | 7/2021 | Skrbic | B60L 53/14 |

* cited by examiner

*Primary Examiner* — Suchin Parihar
(74) *Attorney, Agent, or Firm* — David B Kelley; Brooks Kushman P.C.

(57) ABSTRACT

A portable vehicle-charging system includes a control-pilot circuit configured to generate a plurality of signals, each of the signals having a unique duty cycle that corresponds to a predetermined charging current to be used during a charging event. The system further includes a global positioning system (GPS) module configured to output GPS data indicative of a location of the portable vehicle-charging system. A controller of the system is programmed to receive the GPS data to determine the location of the portable vehicle-charging system, and command the control-pilot circuit to generate the one of the signals corresponding to the location so that the vehicle charges according to a corresponding one of the charging currents that is compatible with a power grid of the location.

20 Claims, 4 Drawing Sheets

PORTABLE VEHICLE CHARGING SYSTEM WITH LOCATION DETECTION

TECHNICAL FIELD

This application relates to charging systems for electrified vehicles and more particularly to portable charging systems configured to interface with power grids of multiple countries through location detection.

BACKGROUND

Electric and plug-in electric vehicles require an interface to external charging devices. In order to promote standard interfaces among vehicle and charge station manufacturers, industry standards have been developed. One such standard is the SAE Electric Vehicle and Plug in Hybrid Electric Vehicle Conductive Charge Coupler (J1772) standard. The J1772 standard defines a charge coupler and the associated protocol required for transferring energy to the vehicle. The standard defines a common interface that all vehicle and charge station manufacturers are encouraged to follow. The standard defines the interface between the vehicle and the electric vehicle supply equipment (EVSE).

SUMMARY

According to one embodiment, a portable vehicle-charging system includes a control-pilot circuit configured to generate a plurality of signals, each of the signals having a unique duty cycle that corresponds to a predetermined charging current to be used during a charging event. The system further includes a global positioning system (GPS) module configured to output GPS data indicative of a location of the portable vehicle-charging system. A controller of the system is programmed to receive the GPS data to determine the location of the portable vehicle-charging system, and command the control-pilot circuit to generate the one of the signals corresponding to the location so that the vehicle charges according to a corresponding one of the charging currents that is compatible with a power grid of the location.

According to another embodiment, a portable vehicle-charging system includes a controller and a control-pilot circuit configured to command a charging current to a vehicle. The controller is programmed to, in response to the portable vehicle-charging system being in a first location with an associated power grid having a first current rating, command the control-pilot circuit to generate a first signal that includes a charging-current parameter equal to the first current rating, and, in response to the portable vehicle-charging system being in a second location with another associated power grid having a second current rating that is different than the first current rating, command the control-pilot circuit to generate a second signal that includes a charging-current parameter equal to the second current rating.

According to yet another embodiment, a portable vehicle-charging system includes a controller programmed to, in response to the portable vehicle-charging system being in a first location having a first power grid, output a first charging-current parameter to a vehicle that is indicative of a current rating of the first power grid. The controller is further programmed to, in response to the portable vehicle-charging system being in a second location having a second power grid with a different current rating than the first power grid, output a second charging-current parameter to a vehicle that is indicative of a current rating of the second power grid.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
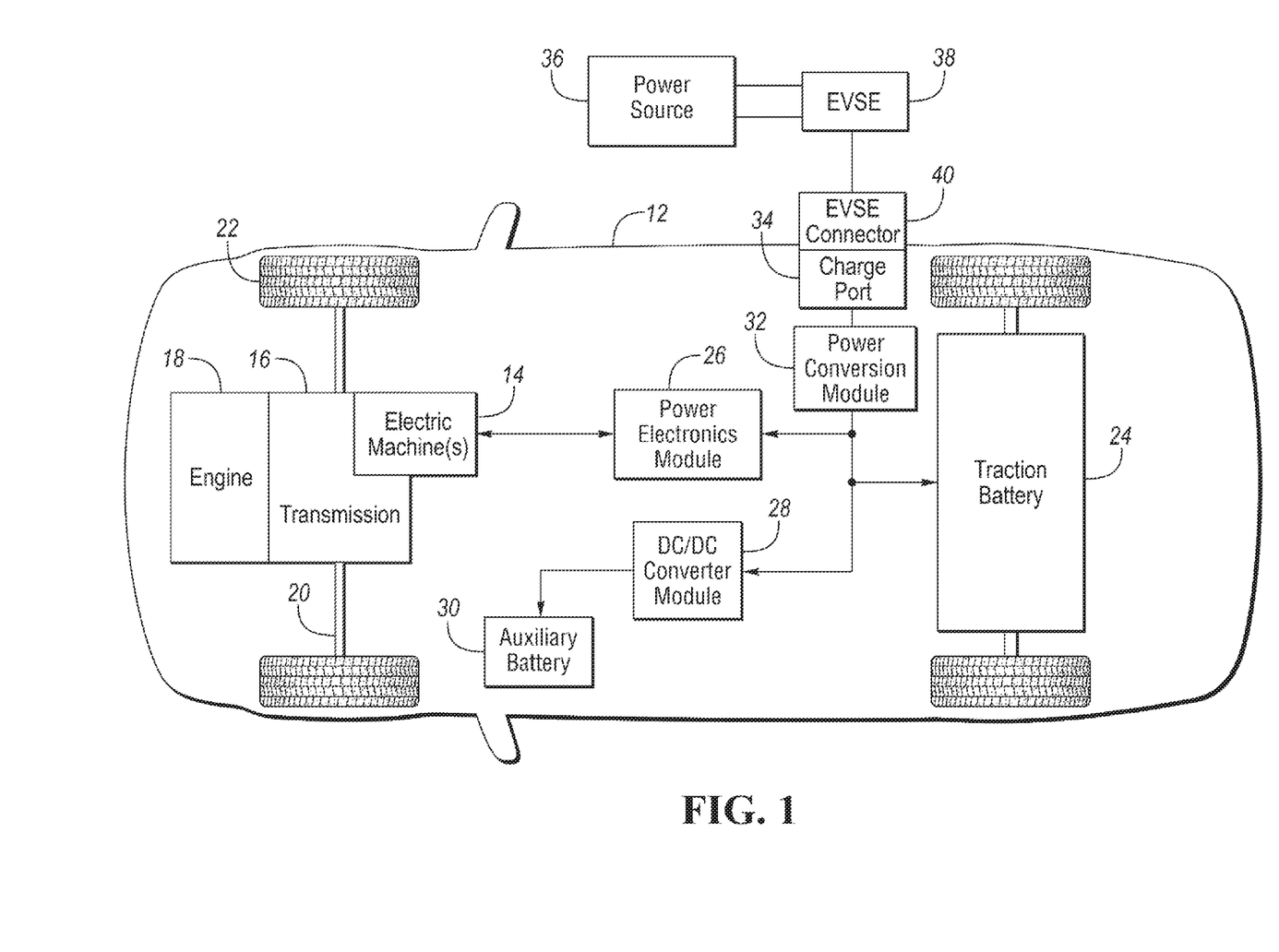
FIG. 1 is a diagram of a plug-in hybrid-electric vehicle illustrating drivetrain and energy storage components.

FIG. 1 depicts a plug-in hybrid-electric vehicle (HEV). The vehicle 12 may include one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and slowing capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode under certain conditions.

A traction battery or battery pack 24 stores energy that can be used by the electric machines 14. A vehicle battery pack 24 typically provides a high voltage DC output. The battery pack 24 is electrically connected to one or more power electronics modules 26. The power electronics module 26 is also electrically connected to the electric machines 14 and provides the ability to bi-directionally transfer energy between the battery pack 24 and the electric machines 14. For example, a typical battery pack 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the battery pack 24. The description herein is equally applicable to a purely electric vehicle. For a purely electric vehicle, the hybrid transmission 16 may be a gear box connected to an electric machine 14 and the engine 18 may not be present.

In addition to providing energy for propulsion, the battery pack 24 may provide energy for other vehicle electrical systems. A typical system may include a DC/DC converter module 28 that converts the high voltage DC output of the battery pack 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary 12V battery 30.

The vehicle 12 may be an electric vehicle or a plug-in hybrid vehicle in which the battery pack 24 may be recharged by an external power source 36 such as a power grid of an electrical utility. The external power source 36 may be a connection to an electrical outlet. A vehicle charging system such as electric vehicle supply equipment (EVSE) 38 is configured to electrically connect to the power source. The EVSE 38 may be a portable unit that includes a plug receivable in the electrical outlet. The EVSE 38 may provide circuitry and controls to regulate and manage the transfer of energy between the power source 36 and the vehicle 12. The external power source 36 may provide DC or AC electric power to the EVSE 38. The EVSE 38 may have a vehicle connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module may condition the power supplied from the EVSE 38 to provide the proper voltage and current levels to the battery pack 24. The power conversion module 32 may interface with the EVSE 38 to coordinate the delivery of power to the vehicle. The EVSE connector 40 may have pins (also known as terminals) that mate with corresponding pins of the charge port 34.

The various components discussed may have one or more associated controllers to control and monitor the operation of the components. While sometimes illustrated as one controller, the controller may be part of a larger control system and may be controlled by various other controllers. It should therefore be understood that any reference to "a controller" means one or more controllers. The controllers may communicate via a serial bus (e.g., Controller Area Network (CAN)) or via discrete conductors. The controller may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle. The controller may communicate with various modules, sensors, actuators, etc., via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller within each of the subsystems identified below.

Figure 2:
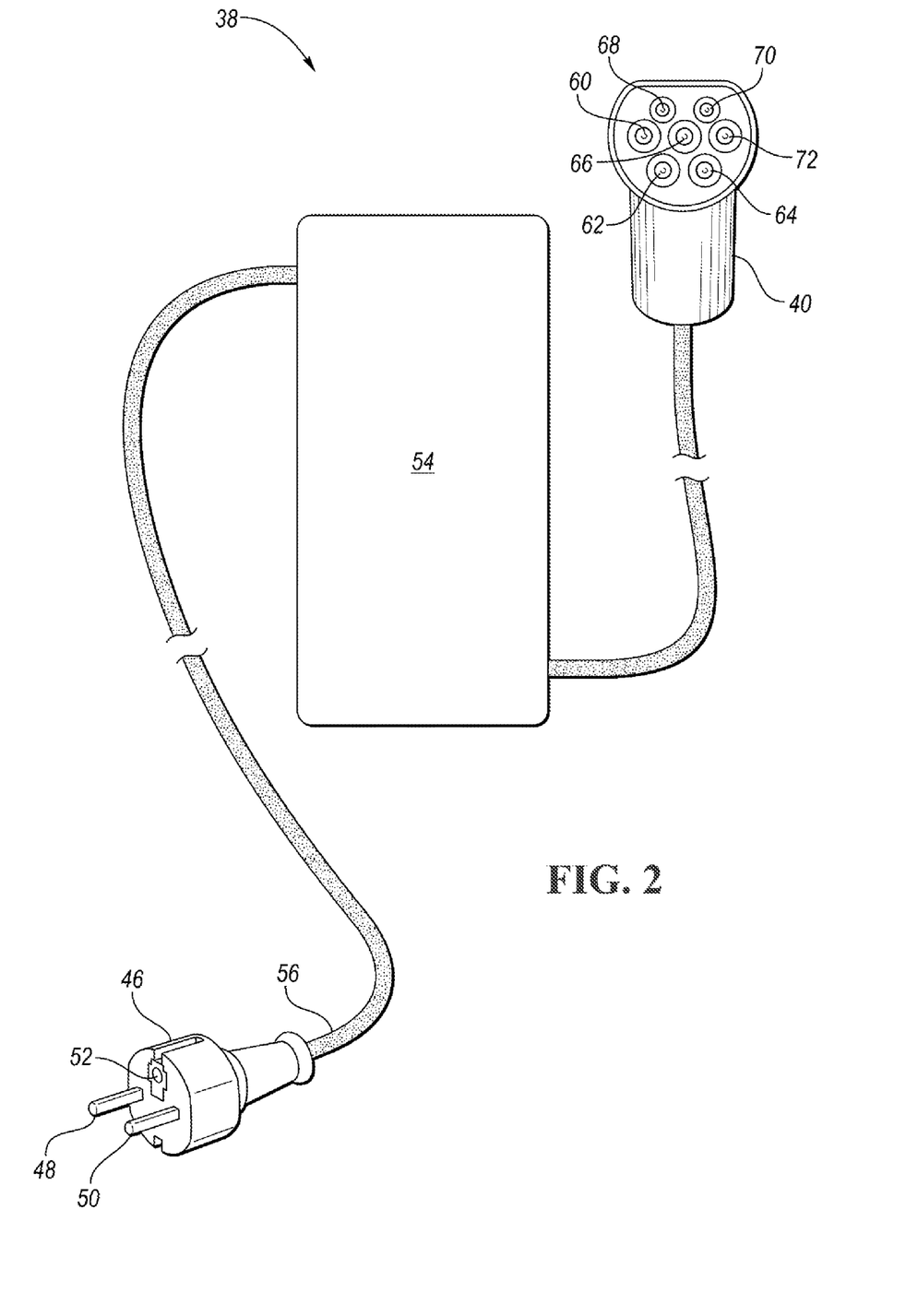
FIG. 2 is a diagrammatical view of a portable EVSE according to one embodiment.

Referring to FIG. 2, the EVSE 38 is a charging system that can be easily moved by a person allowing them to charge their vehicle at any location that includes a wall outlet, i.e., a portable EVSE. This is in contrast to a stationary EVSE in which the unit is hardwired to a building electrical system. The portable EVSE 38 may be an AC charging system. The EVSE 38 includes a grid plug 46 that is configured to connect with an electrical outlet. Many different types of grid plugs are available depending upon the country in which the EVSE 38 is designed for and the voltage/current of the EVSE 38. In the United States of America, the grid plug may be one of a plurality of standardized plugs according to the Nation Electrical Manufactures Association (NEMA). For example, the grid plug 46 may be a NEMA 5. In Europe, other standard plug types may be used. For example, the plug 46 may be a CEE 7/7 (as shown). The plug 46 may include a pair of pins 48 and 50 configured to be received within a corresponding outlet and a female ground receptacle 52. The grid plug 46 is connected to a housing 54 by a wire or cord 56. The housing 54 contains the electrics of the EVSE, which will be described below.

The EVSE 38 also includes a vehicle connector 40 that connects the portable EVSE 38 to the vehicle. The vehicle connector 40 may also be a standardized connector. If for example, the connector may be according to the SAE J1772 standard for North America or the IEC 62196 for Europe. The EVSE 38 as shown with a European vehicle connector that includes three line pins 60, 62, and 64. The connector 40 also includes a ground pin 66, a proximity pin 68, a control-pilot pin 70, and a neutral pin 72.

In order to take full advantage of a portable EVSE, particularly in Europe, the EVSE needs to be functional in a plurality of different countries. Many European countries use a standard plug, e.g., CEE 7/7, however, some countries have a lower continuous current rating than others. For example, most European countries using the CEE 7/7 have a current rating of 13 amperes (A), but a small number of countries, such as France, Finland, and Norway, only allow 8 or 10 amperes. Therefore, a fixed current EVSE cannot be used in all counties despite having a same grid plug.

To solve this and other problems, the EVSE 38 is configured to change the charging current based on a sensed location of the EVSE 38. That is, the EVSE 38 is configured to automatically detect its location to determine the country in which it resides and change the commanded charging parameters to align with the specifications, e.g., maximum current rating, of the power grid in that country. For example, when the EVSE 38 is in Germany, the current parameter is set to 13 A and when in France, the current parameter is set to 8 A.

Figure 3:
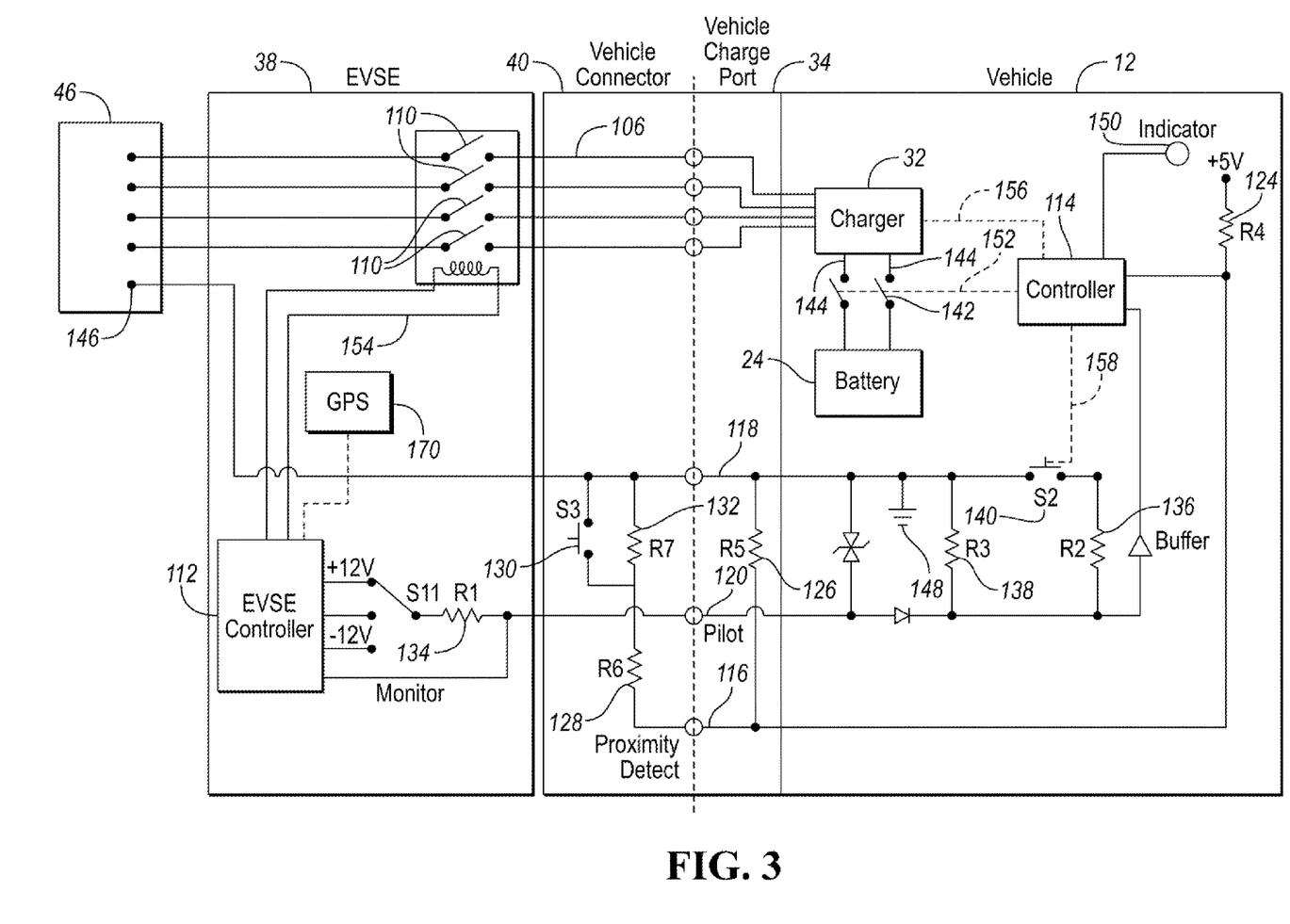
FIG. 3 is a diagram illustrating a connection interface between a vehicle and EVSE.

FIG. 3 shows a high-level diagram of a charging system. The charging system may be based on the J1772 standard, the IEC 62752, etc. The vehicle 12 may have an onboard power conversion or charger module 32 that converts a voltage provided by portable EVSE 38 to a voltage compatible with the battery 24. The EVSE 38 may provide an AC voltage while the battery 24 requires a DC voltage. The onboard charger 32 may convert the AC voltage to a DC voltage required by the battery 24. The operation may be controlled by one or more controllers 114 in the vehicle 12 and by one or more controllers in the EVSE 38. Between the battery 24 and charger 32, there may be one or more contactors 142 present. The charge contactors 142 may selectively couple output lines 144 of the charger 32 and the terminals of the traction battery 24. The charge contactors 142 may isolate the battery 24 from the charger 32 when not charging the traction battery. When a connection to the charger output lines 144 is required, the contactors 142 may be closed to connect the battery 24 to the charger 32. The contactors 142 may be opened and closed by a control signal 152 driven by one or more controllers 114. The contactors 142 may utilize a relay-type contactor or a solid-state device to achieve the function. The contactors 142 may be opened when a charge connector 40 is not attached to the charge port 34.

The EVSE connector 40 connects to the vehicle charge port 34. The EVSE 38 may provide one or more high-power lines 106 to the vehicle 12. The high-power lines 106 may provide a line for high-voltage and a return path to complete the circuit. The EVSE 38 may be capable of connecting and disconnecting AC input power 108 to the high-power lines 106 as required. The EVSE 38 may have contactors 110 for selectively connecting the high-power lines 106 to the AC input power 108. The EVSE contactors 110 may be opened and closed by a control signal 154 driven by the EVSE controller 112. The contactors 110 may utilize a relay-type contactor or a solid-state device to achieve the function. The control signal 154 may drive a relay coil to control a relay.

In addition to the high-power lines 106, the EVSE 38 may interface with the vehicle 12 via a number of signal lines (116, 120) to aid in controlling the charging process. The signal lines are low-power signals that provide an interface between the control module 112 of the EVSE 38 and the controller 114 in the vehicle 12. The EVSE control circuit 112 may include a microprocessor system having the capability to process the input values and generate output signals as appropriate. The controllers (114, 112) may include appropriate analog-to-digital conversion circuitry to measure the voltage level of the signals.

The signals may be monitored to determine whether an EVSE connector 40 is connected to the charge port 34. Detecting a connection is important as it may provide an indication that charging is possible and also to prevent a driver from driving off while an EVSE connector 40 is attached to the vehicle 12. A proximity signal 116 may be defined that is indicative of a state of engagement between the charge port 34 and the EVSE connector 40. The voltage of the proximity input 116 measured by the controller 114 may vary based on the configuration of various resistances in the circuit.

In addition to the signal connections, a ground connection 118 may be provided by the EVSE connector 40. The ground connection 118 may provide a path to the ground point 146 of the EVSE 38. The corresponding vehicle charge port 34 connection may be connected to a ground connection 148 of the vehicle 12. When the EVSE connector 40 is plugged into the charge port 34, the EVSE ground 146 and the vehicle ground 148 may be at a common level. The common ground 146 allows both controllers to determine the same level of the voltages on the signal lines (120, 116).

The voltage of the proximity detect input 116 at the controller 114 input varies as a function of the voltage divider network created by the resistance values in the EVSE connector 40 and the vehicle charge port 34. In an unconnected condition, the proximity signal 116 may have a voltage that is the result of voltage divider circuit comprised of resistances R4 124 and R5 126 relative to the vehicle ground 148. The approximate voltage that would be measured at the controller 114 may be 5V*(R5/(R5+R4). A voltage at this level may be indicative of disengagement between the charge port 34 and the EVSE 38.

When the EVSE connector 40 is installed in the charge port 34 and the pins have made contact, resistances R6 128 and R7 132 may be in parallel with resistance R5 126. This alters the voltage divider network and changes the voltage measured at the proximity detect input 116. The EVSE connector 40 may have a button or latch that operates a switch S3 130. The button or latch may change the state of switch S3 130 when inserting or removing the EVSE connector 40. If the switch S3 130 is open, the series combination of R6 128 and R7 132 will be in parallel with R5 126. If switch S3 130 is closed, R6 128 will be in parallel with R5 126. In each case, the voltage measured by the controller 114 will change levels. By measuring the voltage of the proximity detect pin 116, the vehicle controller 114 can determine if the EVSE connector 40 is attached and the status of the switch S3 130. To summarize, a controller 114 may read a different voltage value when the charge connector 40 is not connected, when the charge connector 40 is connected with switch S3 130 open, and when the charge connector 40 is connected with the switch S3 130 closed.

A control-pilot signal 120 may be present. The one or more standards may defines the behavior of the control-pilot signal 120. The pilot signal 120 is used to control the charging process and, among other things, specifies the maximum current rating for the charging event. The vehicle 12 and the EVSE 38 are expected to monitor the pilot signal 120 and respond according to the status of the signal. The EVSE controller 112 may connect the pilot signal 120 to output values of +12V, −12V, or a pulse width modulation (PWM) output depending on the charging status. When the EVSE connector 40 is disengaged from the charge port 34, the EVSE controller 112 may connect the pilot signal 120 pin to +12V. When the connector 40 is disengaged from the charge port 34, the vehicle controller 114 may measure a value near zero volts as the pilot signal 120 is connected to the vehicle ground 148 through resistor R3 138. A pilot signal 120 measured by the vehicle controller 114 that is near zero volts may be indicative of a state of disengagement between the EVSE connector 40 and the charge port 34 and may represent a default vehicle pilot signal 120.

Once the EVSE connector 40 is engaged in the vehicle charge port 34, the +12V originating from the EVSE controller 112 may be provided to the vehicle pilot signal circuitry. When the connector 40 is engaged and connected to the charge port 34, the pilot signal 120 voltage at the connector may be defined by the voltage divider formed by resistances R1 134 and R3 138 relative to ground 146. The resulting voltage may indicate to the vehicle controller 114 and EVSE controller 112 that the connecter 40 is connected to the charge port 34 and represents a valid pilot signal 120. Under normal conditions, the proximity detect signal 116 may indicate the same engagement status.

In response to a connection being established, the vehicle controller 114 may close a switch S2 140 which places resistance R2 136 in parallel with resistance R3 138. The switch S2 140 may normally be open. The switch S2 140 may be controlled by the vehicle controller 114 via a control signal 158. The switch S2 140 may be a relay or solid-state switching device. The vehicle controller 114 should close switch S2 140 if it determines that the vehicle 12 is ready to accept energy from the EVSE 38. A condition for closing switch S2 140 may be that the vehicle is in a proper non-propulsion state. The condition may include being in a parked condition or at zero vehicle speed. Closing the switch S2 140 alters the voltage divider that was formed by R1 134 and R3 138 by placing resistance R2 136 in parallel with resistance R3 138 and the voltage level of the pilot signal 120 may be changed. The controllers (112, 114) may monitor the control pilot 120 voltage level to determine the current status of the pilot signal 120 based on the voltage measurement.

Once it is determined that the vehicle 12 is ready to accept energy from the EVSE 38, the EVSE controller 112 may provide a PWM signal, e.g., a square wave, with a defined frequency to the pilot line 120. The duty cycle of the PWM signal may be proportional to the amount of current that the EVSE 38 is capable of providing. In this way, the EVSE 38 communicates (commands) a charging-current parameter to a vehicle, which the vehicle interprets to as the maximum charging current for the charging event. The pilot signal 120 may be considered valid when the frequency and duty cycle of the PWM signal are within predefined limits. Once the vehicle 12 is ready to accept energy from the EVSE 38, the contactors 110 for providing power to the vehicle 12 may be closed to initiate charging.

The EVSE 38 includes a location-detection module, such as GPS module 170, configured to determine the location of the EVSE 38. The GPS module 170 may be receiver, such as a GPS chip, that communicates with satellites of the GPS. The GPS chip is configured to receive data from the satellites and output latitude and longitude data that can be used by a controller of the EVSE 38 to determine the country in which it is currently located. The GPS module 170 may be configured to determine the GPS data ONLINE or OFFLINE (i.e., with or without a wireless modem.) OFFLINE determination may be accomplished, for example, with a memory chip and k-d tree nearest neighbor searching. The controller 112, or an intermediate controller (not shown), interprets the GPS data to determine the location of the EVSE 38. At least one controller of the EVSE 38 may include one or more associated GPS lookup tables stored in memory. The GPS lookup table(s) correlates the GPS data with countries.

Once the EVSE 38 determines which country it is located in, the EVSE 38 determines the continuous current rating (maximum charge current) to be used during charging. One or more controllers of the EVSE 38 may include a current-rating lookup table that correlates the continuous-current rating with countries. The EVSE 38 then sets the charging parameters, including charge current, according to the continuous current rating for the country in which it is currently located. The current-rating lookup table, or a third lookup table, may correlate control-pilot signals with the continuous-current rating. This allows the EVSE 38 to determine the correct signals to send to the vehicle over the control-pilot circuit to command the correct charging current.

The EVSE 38 may communicate the charging parameters to the vehicle using the control-pilot circuit as discussed above. One of these parameters is the charging current. The EVSE 38 may command different charging currents to the vehicle by modifying the duty cycle of the PWM. (As discussed above, the vehicle is configured to modify the charging current based on the duty cycle of the PWM.) That is, in one or more embodiments, the control-pilot circuit is configured to generate a plurality of signals interpretable by a vehicle, each of the signals having a unique duty cycle that corresponds to a predetermined charging current to be used during a charging event. The EVSE 38 is able to function in many different countries due to its ability to recognize its location and output the appropriate signal to command the vehicle to charge according to the continuous-current rating of that country. That is, the EVSE 38 is configured to output different signals when in different countries. For example, the controller of the EVSE 38 may be programmed to, in response to the portable vehicle-charging system being in a first location with an associated power grid having a first current rating, command the control-pilot circuit to generate a first signal that includes a current parameter equal to the first current rating, and, in response to the portable vehicle-charging system being in a second location with another associated power grid having a second current rating that is different than the first current rating, command the control-pilot circuit to generate a second signal that includes a current parameter equal to the second current rating.

Control logic or functions performed by the controller(s) of EVSE 38 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller, such as controller 112. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 4:
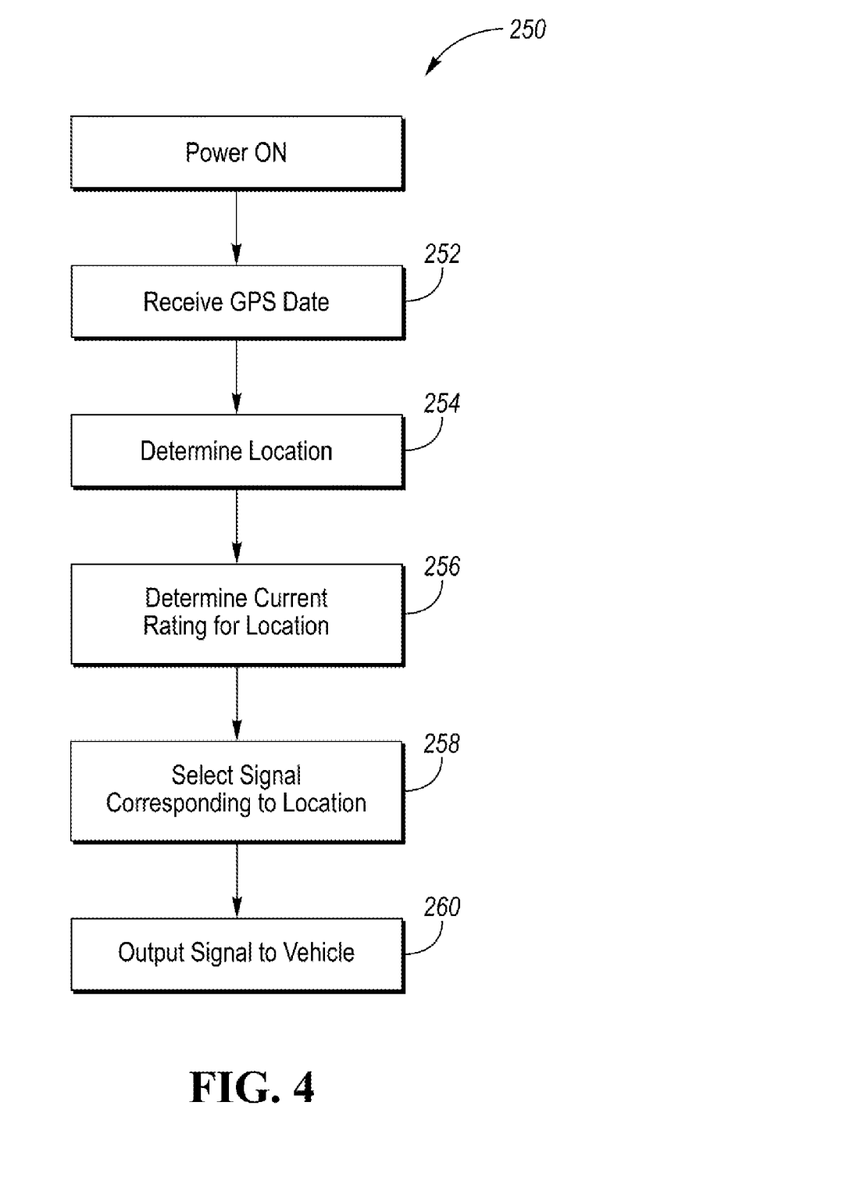
FIG. 4 is a flow chart of an algorithm for operating a portable EVSE.

FIG. 4 is a flowchart 250 of an example algorithm for controlling a portable vehicle charging system (e.g., EVSE 38). The controls begin following power ON of the EVSE, which may be initiated by a user pressing a power button. At operation 252, the controller of the EVSE receives GPS data from a GPS module. At operation 254, the controller interprets the GPS data to determine the location (the country) of the EVSE. The controller may interpret the GPS data using one or more lookup tables stored in memory that correlate longitudinal and latitudinal coordinates with countries. Once the location is determined, the controller then determines the current rating of the power grid for that location at operation 256. The controller may use one or more lookup tables that correlate current rating with countries.

The controller is programmed to command a plurality of different signals to the vehicle. The signals may be square waves produced by PWM. Each of the signals has a unique duty cycle that is used to command a predetermined charging current (also referred to as a charging-current parameter) to the vehicle. The controller may utilize one or more lookup tables to determine the appropriate signal based on the location of the EVSE. At operation 258, the controller selects the one of the signals that corresponds to the current location of the EVSE. The controller then outputs that signal to the vehicle at operation 260. The controller may output the signal to the vehicle using the control-pilot circuit as discussed above. The vehicle, in turn, receives the signal and interprets it to determine the charging-current parameter (e.g., the maximum current) to be used during the charging event.

The EVSE 38 may also be configured to provide ground resistance monitoring. Ground monitoring continuously checks the protective earth connection to ensure that it stays within specified limits. If the resistance increases beyond the limit, the ground monitor requests to stop power transfer. This ground resistance monitoring is not configured for use with IT earthing systems, which some countries (e.g., Norway) employ, and results in an error code that prevents the EVSE from charging. In order to use the EVSE 38 in countries having IT earthing systems, the ground resistance monitoring needs to be disabled. The EVSE 38 is configured to disable the ground resistance monitoring when it is located within an IT earthing system country. The EVSE 38 may include a lookup table that correlates country location with IT earthing systems allowing the controller to disable the ground resistance monitoring when the EVSE 38 is within these countries.

This location-based solution to geographical grid complexity among countries allows a same EVSE to be used in many different countries. This has advantages over EVSEs that are only suitable for use in a select number of countries as it reduces the number of EVSEs a manufacture needs to produce and allows greater usability to the end-user.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A portable vehicle-charging system comprising:
   a control-pilot circuit configured to generate a plurality of signals communicable between the portable vehicle-charging system and a vehicle controller, each of the signals having a unique duty cycle that corresponds to a predetermined charging current to be used during a vehicle charging event;
   a global positioning system (GPS) module configured to output GPS data indicative of a location of the portable vehicle-charging system; and
   a controller programmed to:
      receive the GPS data to determine the location of the portable vehicle-charging system, and
      command the control-pilot circuit based on the GPS data to generate the one of the signals corresponding to the location so that the vehicle charges according to a corresponding one of the charging currents that is compatible with a power grid of the location.

2. The vehicle-charging system of claim 1 further comprising:
   a grid plug connectable to the power grid; and
   a vehicle connector connectable to a charge port of the vehicle.

3. The vehicle-charging system of claim 2, wherein the control-pilot circuit includes a control-pilot terminal disposed in the vehicle connector.

4. The vehicle-charging system of claim 1, wherein the control-pilot circuit includes a wave generator that generates the signals in the form of pulse-width modulation signals having the unique duty cycles.

5. The vehicle-charging system of claim 1 further comprising memory storing one or more lookup tables correlating the GPS data to countries.

6. The vehicle-charging system of claim 5, wherein the controller is further programmed to:
   in response to receiving the GPS data, determine a country in which the vehicle-charging system is located using the lookup table, and
   select the one of the signals corresponding the country.

7. The vehicle-charging system of claim 1, wherein the controller is further programmed to, in response to an IT earthing system being detected, disable a ground resistance monitoring feature of the vehicle-charging system.

8. A portable vehicle-charging system comprising:
   a control-pilot circuit configured to command a charging current to a vehicle; and
   a controller programmed to:
      in response to the portable vehicle-charging system being in a first location with an associated power grid having a first current rating, command the control-pilot circuit to generate a first signal that includes a charging-current parameter equal to the first current rating, and
      in response to the portable vehicle-charging system being in a second location with another associated power grid having a second current rating that is different than the first current rating, command the control-pilot circuit to generate a second signal that includes a charging-current parameter equal to the second current rating.

9. The vehicle-charging system of claim 8 further comprising a global positioning system (GPS) module configured to output GPS data, wherein the first and second locations are determined using the GPS data.

10. The vehicle-charging system of claim 8, wherein the controller is further programmed to, in response to an IT earthing system being detected, disable a ground resistance monitoring feature of the vehicle-charging system.

11. The vehicle-charging system of claim 8, wherein the first and second signals are square waves.

12. The vehicle-charging system of claim 11, wherein the first and second signals have different duty cycles.

13. The vehicle-charging system of claim 8 further comprising:

a grid plug connectable to the power grid; and a vehicle connector connectable to a charge port of the vehicle.

14. The vehicle-charging system of claim 13, wherein the control-pilot circuit includes a control-pilot terminal disposed in the vehicle connector.

15. The vehicle-charging system of claim 8, wherein the control-pilot circuit includes a wave generator that generates the first and second signals as pulse-width modulation signals having the unique duty cycles.

16. The vehicle-charging system of claim 8 further comprising memory storing one or more lookup tables correlating at least the first and second locations with the first and second current ratings.

17. The vehicle-charging system of claim 8, wherein the first and second current parameters indicate maximum charging current.

18. A portable vehicle-charging system comprising:
a controller programmed to:

in response to the portable vehicle-charging system being in a first location having a first power grid, output a first charging-current parameter to a vehicle that is indicative of a current rating of the first power grid; and in response to the portable vehicle-charging system being in a second location having a second power grid with a different current rating than the first power grid, output a second charging-current parameter to a vehicle that is indicative of a current rating of the second power grid.

19. The vehicle-charging system of claim 18, wherein the first and second charging-current parameters indicate maximum charging current.

20. The vehicle-charging system of claim 18 further comprising a global positioning system (GPS) module configured to output GPS data, wherein the controller is further programmed to determine the first and second locations based on the GPS data.

* * * * *